3,509,231
OXAZOLIDINONES AND THIAZOLIDINONES AS LATENT CATALYSTS FOR CURING POLYEPOXIDE RESINS
Dan E. Ranck, Sanford, and John C. Safranski, Midland, Mich., assignors to The Dow Chemical Company, Midland, Mich., a corporation of Delaware
No Drawing. Filed Aug. 21, 1967, Ser. No. 661,804
Int. Cl. C08g 45/04
U.S. Cl. 260—837                                  7 Claims

ABSTRACT OF THE DISCLOSURE

Certain substituted oxazolidinones, thiazolidinones and imidazolidinones are effective as latent catalysts for curing polyepoxide resins admixed with a polycarboxylic acid or anhydride as a hardening agent.

---

The present invention relates to the curing of polyepoxide resins. More particularly the invention relates to a latent curing catalyst for polyepoxide resins admixed with polycarboxylic acid anhydrides or polycarboxylic acids wherein the latent catalyst is selected from cerain substituted oxazolidinones, thiazolidinones and imidazolidinones.

It is well known to employ various amines and quaternary ammonium compounds to catalyze the epoxy-carboxylic acid or epoxy-carboxylic acid anhydride curing reactions. Generally the tertiary amine compounds are preferred over the primary or secondary amines since the latter amines are too reactive at room temperature resulting in short pot life and difficulties in utilizing the composition before gelation begins. However gelation problems are encountered with the tertiary amines as well.

A continued research goal in the field of epoxy resins has been effective latent curing catalysts where the catalyzed composition is stable at room temperature and at an elevated temperature the catalyst is activated to effect thermal curing of the epoxy resin composition.

Accordingly the present invention provides for latent curing catalysts which are stable at room temperature and which are activated at an elevated temperature to catalyze the reaction between an epoxy group and a carboxylic acid group or a carboxylic acid anhydride group. The latent catalysts of this invention include certain substituted oxazolidinones, thiazolidinones and imidazolidinones.

The utility of these catalysts is believed to reside in their thermal decomposition products wherein amines and other compounds are produced which are effective catalysts, whereas the parent compound exerts little catalytic activity at room temperature.

Suitable oxazolidinone catalysts have the following formula:

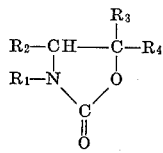

wherein $R_1$ is hydrogen, a lower alkyl radical, a lower hydroxyalkyl radical or aryl; $R_2$ and $R_3$ are hydrogen or alkyl radicals; and $R_4$ is an alkyl or aryl radical. Such compounds include 5-methyl-2-oxazolidinone, 5-ethyl-2-oxazolidinone, 5-phenyl-2-oxazolidinone and the like and N-ethyl-5-methyl-2-oxazolidinone, N-phenyl-5-methyl-2-oxazolidinone, N-hydroxyethyl-5-methyl-2-oxazolidinone and the like. Preferred oxazolidinones include those having an aryl substituent, such as phenyl, or alkyl groups having from 1 to 4 carbon atoms.

Imidazolidinones of the following structure are also suitable as latent catalysts:

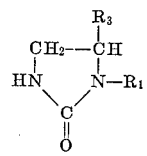

wherein $R_1$ and $R_3$ are as previously defined. Typical of such catalysts is 2-hydroxypropyl-3-methyl imidazolidinone and the like. Similarly, substituted thiazolidinones of the following structure are suitable:

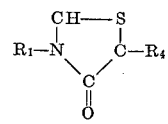

wherein $R_1$ and $R_4$ are as previously described. Such compounds include 5-phenyl-4-thiazolidinone, and the like.

The latent curing catalysts of this invention are generally used in amounts up to about 5 percent by weight of the resin components. Preferably the concentration is between about 0.5 and about 2 percent by weight. The activation temperature will vary with each compound but usually is about 160° C. or higher.

The polyepoxides are well known resins which contain more than one oxirane group per molecule and are also known as ethoxyline resins. One well known class includes the glycidyl polyethers of polyhydric phenols and polyhydric alcohols. Polyhydric phenols commonly used are resorcinol, hydroquinone, bis-phenol A and the like. A variety of polyhydric alcohols may be used including polyethylene and polypropylene glycols and the like.

Epoxy novolacs represent another well known class of resins based on glycidyl polyethers of phenol-aldehyde condensation products. In addition to glycidyl polyethers various other resins having reactive oxirane groups introduced by epoxidation of unsaturated compounds such as soy bean oils, polydienes and the like are useful in this invention.

The preferred polyepoxides are the glycidyl polyethers prepared from 4,4'-isopropylidene bisphenol (bisphenol A) having epoxide equivalent weights ranging from about 170 to about 700.

The polycarboxylic acid anhydrides may be any of those which possess at least one anhydride group. A large variety of such anhydrides are known to those skilled in the art including polymers which contain anhydride groups such as styrene-maleic anhydride copolymers, olefin-maleic anhydride copolymers and the like. Additional examples of polycarboxylic acid anhydrides which are suitable are dodecenyl succinic anhydride, phthalic anhydride, methyl Nadic anhydride, pyromellitic anhydride, and the like.

In addition to the previously recited anhydrides and their acid precursors, polycarboxylic acids useful in this invention include acid-containing copolymers. Such copolymers may be readily obtained or prepared by polymerizing $\alpha,\beta$-unsaturated acids such as acrylic and methacrylic acids with a variety of copolymerizable monomers. The specific preparation of these copolymers are not pertinent to this invention and need not be discussed in detail herein. Likewise the choice of a comonomer or mixture of comonomers is not critical so long as the resulting copolymer contains from about 2 to about 15 percent of reactive carboxylic acid. Additionally, the reactive carboxylic acid group can be introduced into the polymer by chemical reaction such as hydrolysis of an acrylate ester, and the like or by well known graft polymerization techniques.

In accordance with this invention the latent catalyst is admixed with the polyepoxide and the polycarboxylic acid or anhydride. The order of mixing is not critical. Heat may be applied to facilitate mixing so long as the decomposition temperature of the latent catalyst is not exceeded. Frequently temperatures up to 150° C. may be used in mixing. Generally the polyepoxide and the polycarboxylic acid or anhydride are combined in about equivalent proportions, but the epoxy-carboxylic acid equivalent ratios may vary from about 1:0.5 to about 1:1.5.

The resin compositions may then be cured by heating to temperatures above the activation temperature for the latent catalyst. This temperature will range from about 160° C. and higher. Best results appear to be obtainable at a temperature of about 200° C.

The feature which distinguishes the compositions of this invention from those of the prior art is the latent catalyst. The choice of a particular polyepoxide and a polycarboxylic acid or anhydride can be readily made by those skilled in the art depending on the ultimate end use and the desired properties in the cured resin. It is to be understood that other additives commonly used may also be incorporated into the resin compositions of this invention. Such additives include reactive epoxy diluents, inert solvents, inert fillers, colorants, flame retardant additives, and the like.

The invention is further described by the following non-limiting examples.

EXAMPLE 1

The catalyst, 5-methyl-2-oxazolidinone, was added to a mixture of a glycidyl polyether of bisphenol A having an epoxide equivalent weight of 186–192 and a copolymer containing 92 percent styrene and 8 percent acrylic acid. The mixture contained about 1 epoxide equivalent per each equivalent of carboxylic acid and about 2 percent by weight of catalyst based on the weight of resin components. The mixture could be made at 150° C. without gellation occurring. Portions of the catalyzed mixture were then cured at 200° C. for varying periods of time—1 hour, 3 hours, 4 hours and 17 hours. At 200° C. the mixture gelled rapidly and complete curing required about 4 hours.

Under similar conditions the catalyst was mixed with the polyepoxide alone but no satisfactory cure was obtained. The catalyst appears to be effective only when a carboxylic acid or anhydride curing reaction with the epoxide group is involved.

EXAMPLE 2

In a manner similar to that of Example 1 the following catalysts were evaluated and found to be effective in obtaining a cure in about 4 hours at 200° C.: 5-ethyl-2-oxazolidinone, N-hydroxyethyl-5-methyl-2-oxazolidinone and N-ethyl-5-methyl-2-oxazolidinone.

EXAMPLE 3

In a manner similar to that of Example 1, 5-phenyl-2-oxazolidinone was tested as a catalyst. The catalyzed resin mixture gelled rapidly at 200° C. and cured in about 1 hour. An additional test at a 1% catalyst level produced comparable results.

EXAMPLE 4

A resin mixture was prepared in a manner similar to that of Example 1 in which the styrene/acrylic acid copolymer was replaced by an equivalent amount of a styrene/maleic anhydride copolymer. Similar results were obtained.

EXAMPLE 5

Additional tests were made as described in Example 1 with the following compounds as latent catalysts: N-phenyl-2-oxazolidinone and 2-hydroxypropyl-3-methyl imidazolidinone. Comparable results were obtained in both cases.

EXAMPLE 6

In a manner similar to that of Example 1 tests were made at a 1% and a 2% catalyst level with 5-phenyl-4-thiazolidinone as a latent catalyst. Excellent results were obtained with rapid gellation occurring at 200° C. and curing completed in about 1 hour.

EXAMPLE 7

Test bars of ½" x ¼" x 8" were also made with no catalyst and at a 1% catalyst level. Those bars cured without a catalyst for less than 180 minutes at 200° C. were too brittle to remove from the mold. However, those cured with, for example, 5-phenyl-2-oxazolidinone as catalyst had good strength and solvent resistance and could be readily removed from the mold.

A glycidyl polyether of bisphenol A having an epoxide equivalent weight of 230–250 was mixed with a styrene/acrylic acid copolymer (92% styrene; 8% acrylic acid) and 2 percent by weight on the weight of the resins components of 5-phenyl-4-thiazolidinone was added. The mixture was then cured at 200° C. The cured product had excellent tensile strength and solvent resistance.

Similar results to those of the foregoing examples are obtained when an equivalent amount of a polycarboxylic acid anhydride is used in place of the carboxylic acid copolymer.

It is to be understood that variations and changes may be made without departing from the spirit of the invention or the scope of the invention as defined in the following claims.

What is claimed is:

1. A thermosettable resin composition which comprises (a) a polyepoxide having more than one oxirane group per molecule, (b) a curing agent selected from the group consisting of polycarboxylic acids, polycarboxylic acid anhydrides, a carboxyl containing polymer having about 2 to 15 weight percent of reactive carboxyl group and mixtures thereof, wherein the ratio of epoxide groups to carboxyl groups ranges from about 1/0.5 to about 1/1.5, and (c) a latent curing catalyst selected from the group consisting of imidazolidinones having the formula

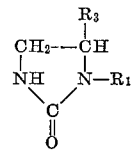

thiazolidinones having the formula

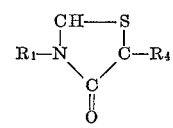

and mixtures thereof, wherein $R_1$ is hydrogen, a lower alkyl, a lower hydroxyalkyl or aryl radical; $R_3$ is hydrogen or alkyl radicals; and $R_4$ is an alkyl or aryl radical.

2. The composition of claim 1 wherein the polyepoxide is a glycidyl polyether of a polyhydric phenol or a polyhydric alcohol.

3. A thermosettable resin composition which compises (a) a polyepoxide having more than one oxirane group per molecule, (b) a curing agent selected from the group consisting of polycarboxylic acids, polycarboxylic acid anhydrides, a carboxyl containing polymer having about 2 to 15 weight percent of reactive carboxyl group and mixtures thereof, wherein the ratio of epoxide groups to carboxyl groups ranges from about 1/0.5 to about 1/1.5, and (c) a latent curing catalyst selected from the group consisting of imidazolidinones having the formula

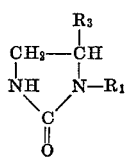

thiazolidinones having the formula

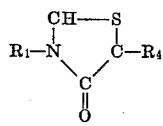

and mixtures thereof, wherein $R_1$ is hydrogen, an alkyl group of 1 to 4 carbon atoms, a hydroxyalkyl group of 1 to 4 carbon atoms or a phenyl group; $R_3$ is hydrogen or an alkyl group of 1 to 4 carbon atoms; and $R_4$ is an alkyl group of 1 to 4 carbon atoms or phenyl.

4. The composition of claim 3 wherein the curing agent is a copolymer of styrene and acrylic acid.

5. The composition of claim 3 wherein the polyepoxide is a glycidyl polyether of a polyhydric phenol or a polyhydric alcohol.

6. The composition of claim 3 wherein the catalyst is 5-phenyl-4-thiazolidinone.

7. A process for producing a resinified product which comprises (a) mixing a polyepoxide having more than one oxirane group per molecule, a curing agent selected from the group consisting of polycarboxylic acids, polycarboxylic acid anhydrides, a carboxyl containing polymer having about 2 to 15 weight percent of reactive carboxyl group and mixtures thereof, wherein the ratio of epoxide groups to carboxyl groups ranges from about 1/0.5 to about 1/1.5, with a latent curing catalyst selected from the group consisting of imidazolidinones having the formula

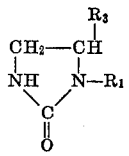

thiazolidinones having the formula

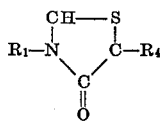

and mixtures thereof, wherein $R_1$ is hydrogen, an alkyl group of 1 to 4 carbon atoms, a hydroxyalkyl group of 1 to 4 carbon atoms or a phenyl group; $R_3$ is hydrogen or an alkyl group of 1 to 4 carbon atoms; and $R_4$ is an alkyl group of 1 to 4 carbon atoms or phenyl; and (b) heating the catalyzed resin mixture above about 160° C.

References Cited

UNITED STATES PATENTS

| 3,324,198 | 6/1967 | Gruver | 260—2 |
| 3,356,645 | 12/1967 | Warren | 260—47 |
| 3,413,377 | 11/1968 | Schramm | 260—830 |
| 3,415,901 | 12/1968 | Schramm | 260—830 |

FOREIGN PATENTS 834,563  5/1960  Great Britain.

SAMUEL H. BLECH, Primary Examiner

P. LIEBERMAN, Assistant Examiner

U.S. Cl. X.R.

260—2, 47, 78.4, 836